(12) United States Patent
Andrews et al.

(10) Patent No.: US 12,118,594 B2
(45) Date of Patent: Oct. 15, 2024

(54) SYSTEM AND METHOD FOR MANAGING ELECTRONIC FILES AND DATA IN A CENTRALIZED COLLABORATIVE WORKSPACE

(71) Applicant: YOURKNOW INC., Laguna Niguel, CA (US)

(72) Inventors: Raefer Andrews, Laguna Niguel, CA (US); Alfred Adams, Rockville, MD (US)

(73) Assignee: YOURKNOW INC., Laguna Niguel, CA (US)

(*) Notice: Subject to any disclaimer, the term of this patent is extended or adjusted under 35 U.S.C. 154(b) by 76 days.

(21) Appl. No.: 17/141,620

(22) Filed: Jan. 5, 2021

(65) Prior Publication Data

US 2021/0201371 A1 Jul. 1, 2021

Related U.S. Application Data

(63) Continuation-in-part of application No. 17/065,815, filed on Oct. 8, 2020, now abandoned, which is a continuation of application No. 13/448,082, filed on Apr. 16, 2012, now Pat. No. 10,817,917.

(60) Provisional application No. 61/548,923, filed on Oct. 19, 2011.

(51) Int. Cl.
*G06Q 30/00* (2023.01)
*G06Q 30/06* (2023.01)

(52) U.S. Cl.
CPC ................................. *G06Q 30/06* (2013.01)

(58) Field of Classification Search
CPC .... G06Q 30/00; G06Q 30/0601; G06Q 30/06; G06Q 30/0623; G06Q 30/0641
See application file for complete search history.

(56) References Cited

U.S. PATENT DOCUMENTS

| | | | |
|---|---|---|---|
| 2003/0018543 A1* | 1/2003 | Alger | G06Q 30/0633 705/26.1 |
| 2004/0153422 A1* | 8/2004 | Sakamura | G06Q 30/06 705/76 |
| 2005/0186942 A1* | 8/2005 | Griffin | H04W 28/02 455/414.1 |
| 2007/0255788 A1* | 11/2007 | Troung | G06Q 10/10 709/205 |
| 2008/0027822 A1* | 1/2008 | Paxson | G06Q 10/06 705/27.1 |
| 2008/0190271 A1* | 8/2008 | Taub | G10H 1/0058 84/645 |
| 2008/0281915 A1* | 11/2008 | Elad | G06Q 30/02 709/204 |
| 2009/0217196 A1* | 8/2009 | Neff | G06Q 10/10 715/799 |

(Continued)

OTHER PUBLICATIONS

Novotny, Jason, Michael Russell, and Oliver Wehrens. "GridSphere: a portal framework for building collaborations." Concurrency and Computation: Practice and Experience 16.5 (2004): 503-513. (Year: 2004).*

(Continued)

*Primary Examiner* — Christopher B Seibert
(74) *Attorney, Agent, or Firm* — Honigman LLP

(57) ABSTRACT

A system and method for managing book content includes a portal for managing users and files including book content.

7 Claims, 1 Drawing Sheet

(56) References Cited

U.S. PATENT DOCUMENTS

| | | | | |
|---|---|---|---|---|
| 2010/0004944 A1* | 1/2010 | Palaniappan | .......... | G06Q 10/10 707/E17.108 |
| 2010/0192072 A1* | 7/2010 | Spataro | ................ | H04L 65/403 709/227 |
| 2011/0261030 A1* | 10/2011 | Bullock | ................ | G06F 3/0488 345/204 |
| 2012/0240085 A1* | 9/2012 | Sim | ........................ | G09B 5/14 715/864 |
| 2012/0311039 A1* | 12/2012 | Ogawa | ................... | G06Q 10/00 709/204 |
| 2013/0013991 A1* | 1/2013 | Evans | ................ | H04N 21/4828 715/250 |
| 2013/0085973 A1* | 4/2013 | Bingham | ............... | G06Q 50/01 706/45 |

OTHER PUBLICATIONS

Zheng, Xianjun Sam, Ilian Sapundshiev, and Robert Rauschenberger. "WikiTable: a new tool for collaborative authoring and data management." Online Communities and Social Computing: Second International Conference, OCSC 2007, Held as Part of HCI International 2007, Beijing, China, Jul. 22-27, 2007. (Year: 2007).*

Godwin-Jones, Robert, "Blogs and wikis: Environments for online collaboration." Language learning & technology 7.2 (2003): 12-16. (Year: 2003).

\* cited by examiner

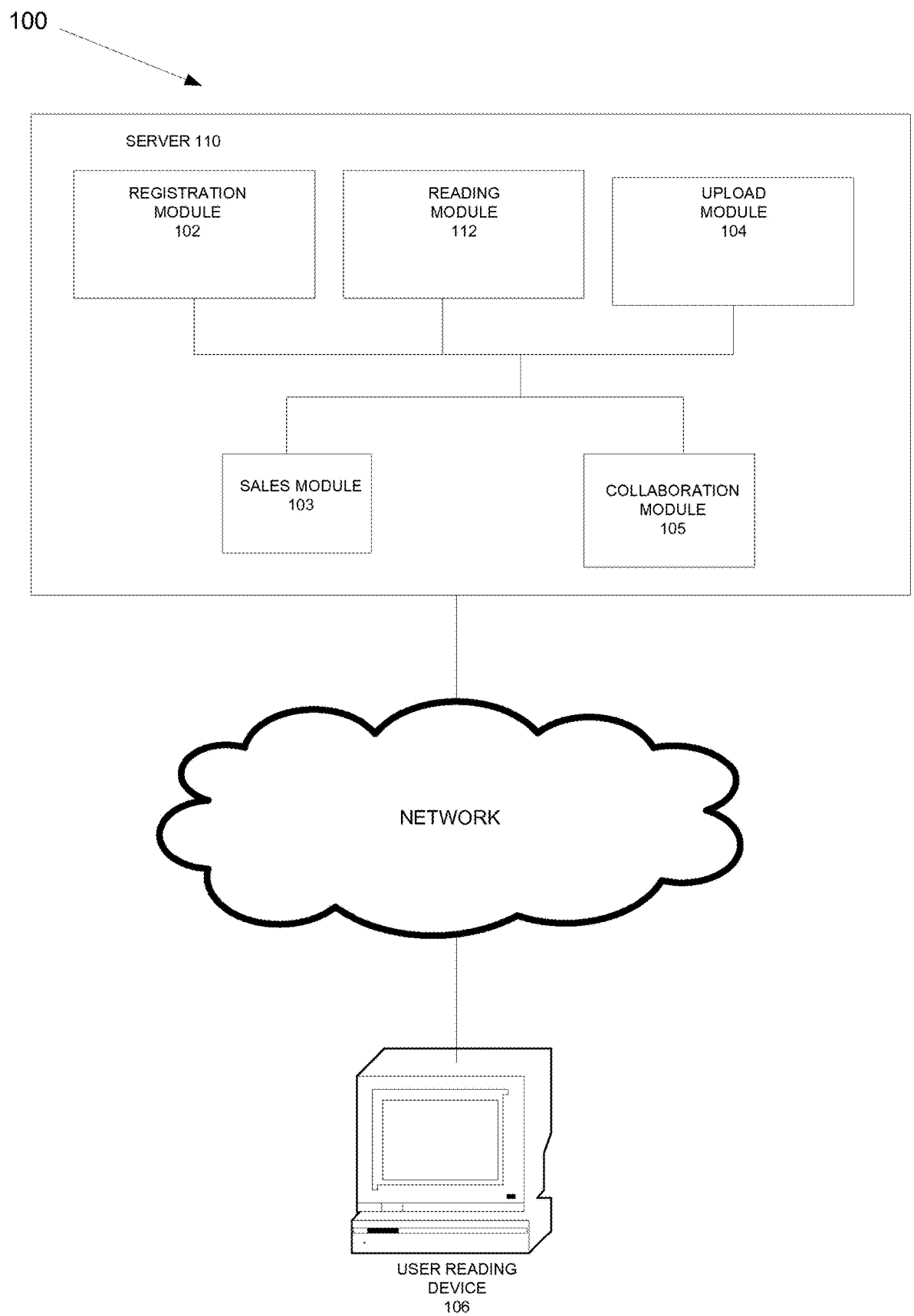

SYSTEM AND METHOD FOR MANAGING ELECTRONIC FILES AND DATA IN A CENTRALIZED COLLABORATIVE WORKSPACE

PRIORITY CLAIM

This application is a continuation-in-part of U.S. patent application Ser. No. 17/065,815, filed Oct. 8, 2020, which is a continuation of U.S. patent application Ser. No. 13/448,082, filed Apr. 16, 2012, which claims priority to U.S. Provisional Application No. 61/548,923, filed Oct. 19, 2011, each of which is incorporated by reference in its entirety.

TECHNICAL FIELD

The present invention is directed to a system and method for managing book content and access.

BACKGROUND

Traditional brick and mortar libraries are effective in providing physical access to books and book content to individuals.

SUMMARY

A system and method for managing electronic book content that meets the needs of publishers and consumers can be realized using a portal system with certain controls. In one aspect, a system for managing access to electronic content can include a computer-implemented server module for containing a plurality of files including content on a server including a processor, a registration module for collecting user information for a plurality of users, an electronic reading module for providing access to each user to selected content for user visualization from the server, and an upload module for transferring files including content to the server.

In certain embodiments, the registration module can collect user information for a plurality of users to a portal to the server and for creating a profile of data associated with each user, wherein the plurality of users of the collaboration portal register as a regular member or a publisher member, the regular member having authorization to read, share, collaborate, upload material.

In certain embodiments, the electronic reading module can provide access to each user to selected content for user visualization on a device from the server without downloading the content to the user the module verifying that the user can have access to publisher rights for the selected book by checking user information on the server and the profile.

In certain embodiments, the upload module can transfer content to a portal database of the server for the verified user to allow the user to view the content, edit the content, and to associate with the profile of the user.

In certain embodiments, the system can include a collaboration module for permitting at least two of the users to work together and interact in the portal.

In certain embodiments, the portal can have a graphical user interface front end. Users can work together and interact in the portal having the graphical user interface front end containing digitally stored information, use a web-based authoring tool that can manage collaborative authoring and generate targeted content, while permitting data for the history and activities for each user while working together and interacting in the portal having a graphical user interface front end in the collaboration module to be summarized and associated with each user's profile, creating a summary of user history and activities for access in the profile of each user.

In other embodiments, the system includes a sales module for permitting purchase of a book accessed through the portal.

In another aspect, a method of creating a personalized song can include registering a plurality of users in a portal, uploading a plurality of files including book content, storing the plurality of uploaded files including book content accessible by the portal, and providing viewing access to a user to a selected uploaded file.

In certain embodiments, registering can include assembling user information associated with each user. In some circumstances, the method can include permitting purchase of a book of the portal, permitting collaboration between users, or grouping the users.

The plurality of users can include a publisher. The file has a data, document, audio, or video format, for example, a format type of .epub, .pdb, .azw, .aeh, .lrf, or .lrx. In certain embodiments, the file can be an ebook.

In certain circumstances, the collaboration authoring tool can allow verified users to selectively pass an electronic authoring and editing pen to each other while working together on file content.

In certain circumstances, a collaboration audio and video module can allow verified users to interact in real time while co-authoring, uploading, sharing, messaging, and publishing files.

In certain circumstances, a hands free module can allow verified users to interact in real time while co-authoring, uploading, sharing, messaging, and publishing files.

In certain circumstances, a highlighting and markup module can allow verified users to highlight and markup content.

In certain circumstances, a file import module can import and transfer content into a collaboration, and to a portal database of the server for the verified users to allow the user to view and edit the content.

Other objectives, features, and advantages of the invention will be more readily understood upon consideration of the following detailed description of the invention, taken in conjunction with the accompanying drawings, and with the claims.

BRIEF DESCRIPTION OF THE DRAWINGS

The present invention is further described in the detailed description which follows, in reference to the noted plurality of drawings by way of non-limiting examples of certain embodiments of the collaboration portal for users to share digitally formatted information, in which like numerals represent like elements throughout the several views of the drawings, and wherein:

FIG. 1 illustrates an exemplary portal system and its components.

DETAILED DESCRIPTION

A detailed explanation of the system and method according to the preferred embodiments of the collaboration portal for users to share digitally formatted information are described below.

As one skilled in the art will appreciate, embodiments of the collaboration portal for users to share digitally formatted information may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

The various techniques, methods, and systems described herein can be implemented in part or in whole using computer-based systems and methods. Additionally, computer-based systems and methods can be used to augment or enhance the functionality described herein, increase the speed at which the functions can be performed, and provide additional features and aspects as a part of or in addition to those described elsewhere in this document. Various computer-based systems, methods and implementations in accordance with the described technology are presented below.

Book content and access can be enhanced by a portal that allows users to access information and collaborate in a networked or on-line environment. Users can have unlimited access to all digitally stored information in the portal. Ultimately, one of the goals of the portal is to create access for every book or literary work in the World in an online environment so that all users of the portal can access and read the materials on demand.

Another goal of the portal is to create educational impact. For example, education institutions can use the portal to create collaboration forums for students, and make available electronic copies of class textbooks for students to access online and in-class. Through use of the portal, students can avoid having to carry bulky hard copy textbooks to class. An electronic reader device that is web-enabled and has internet access capabilities can allow a student to access a copy all current text books for his/her class on demand through the portal.

Another goal of the portal is to provide social network impact. In this use of the portal, global users can share and discuss literary works and writings, and collaborate globally on authorship of new works.

The portal can be managed and controlled in a straightforward manner. For example, the user interface can be developed using a combination of open source software tools and other software development materials. A graphical user interface (GUI) front end for the portal can be created using a combination of ASP.NET and PHP development tools. The back end of the portal can be a SQL database such as MYSQL open source. The web interface plugins for the portal's group collaboration can be customized open source based modules. The portal can utilize vendor hosting options for its network infrastructure and user data collection.

The portal can run on a virtual server technology in the design and implementation of a server farm. The server farm can utilize Microsoft's Hyper V, or VMware, Virtual Server management systems. The server farm can have the ability to be scalable on demand and without any downtime, using existing Virtual Server management or data redundancy technologies. The server system can be designed to have 99.99% availability, by utilizing instantaneous data replication and co-location strategies. Consequently, the server systems can have continuous redundancy to maximize stability and disaster recovery options. Data can be compressed using data de-duplication techniques, and instantaneously replicate with parallel server systems at co-locations throughout the globe. Electronic book readers and other mobile electronic devices can communicate with the portal via the Internet using a web browser interface with user identification and password authentication to the portal. Connecting and authentication to the portal can allow a user to push files (eBooks or data) to the portal database system via the network. User data can be parsed and reformatted by algorithms and then inserted into a database structure.

In certain circumstances, during material upload to the portal, data having copyrighted digital rights markers cannot be uploaded for users to reference. By referencing, users can read portal content but are not able to download or own specific content housed on the portal.

A collaboration portal for users to share digitally formatted information can include at least one server, a registration module, a reading module, and an upload module. The collaboration portal optionally can include, independently, a collaboration module, a sales module, a redirection module and a download module.

The portal can require a fee to access the content of the portal. In other embodiments, the portal can be freely accessed by users. Users can become members by registering. All users, including non-members, will have access to the portal menu items to show the general features of the portal. A non-member user can be permitted to search the entire portal. In certain embodiments, upload functions can be reserved for registered users. A non-member user can be permitted to read all unrestricted materials, such as public domain documents or works available in the portal. The portal can operate in any of major language, for example, one of seventy different languages.

The registration module is configured to allow users to sign up to participate in the collaboration portal. The users of the collaboration portal can register as a regular member or a publisher member. The regular member has authorization to read, share, collaborate, upload material such as electronic books, and participate in all portal activities. The regular member can be authorized to upload electronic books and literary works or other readable materials that are not protected by copyright. The publisher member has authorization to upload material such as electronic books and literary works or other readable materials that are protected by copyright and grants sufficient rights to the regular members of the collaboration portal to allow the regular member to read the material. The publisher member also can have authorization to facilitate a download or sell the material to regular members directly or through a re-direction process to a commercial website.

In the registration module, the user can set up initial user information and authentication, including setting up password requirements and acknowledgement of portal rules. The portal rules can include requiring one more of compliance with copyright management rules, declarations regarding restrictions in portal use, declarations regarding file requirements, and confirmation of age requirements for participation, as necessary. Each user can create and update their profile. The user profile can include a summary of user history and activities, the last time the user logged in to the portal, the content of the last session with ability to resume at the last reading position, a self assigned avatar and user identification for privacy purposes, number of files uploaded and shared to date, the number of associated collaboration groups, and personal information that the user can maintain. When the user is a publisher, registration can include a verification step to confirm that the user can have access to publisher rights.

The reading module is the portion of the portal that allows viewing of all or a portion of the material on the web browser-enabled device. Electronic books can be configured to render the material for reading in a true book-publishing format encapsulated in a web browser via the portal. The reading module can access the uploaded files and allows them to be shared with other users via any web browser-enabled device. Suitable devices include personal computers, tablets, phones, smartphones or electronic readers, such as a Kindle, Nook, or other e-reader.

A registered user can have upload capabilities. In certain embodiments, the user must be registered to have upload capabilities. The upload module permits users to upload electronic files that can be one of many format file types including but not limited to .epub, .pdb, .azw, .aeh, .lrf, or .lrx files. The uploaded files are housed or stored on the server.

When the user is not a publisher, the user can be permitted to upload and share user writings and works. The user writings and works can be materials that are personally authored by the user. The user can be writer, scholar, or innovator. In certain embodiments, a user can be required to separately acknowledge a non-copyright infringement policy for each upload uploading any information to be shared with the portal community.

When the user is a publisher, in addition to the features described for all users, the publisher verification information can include the following: an electronic material category, the author for each material, publication particulars including publication date, copyright ownership acknowledgement, Point of Contact (POC) name, POC Phone Number, POC mailing and email Address, publisher corporate address, purchase information, "Buy Book" ecommerce link for book purchase, material image, or material description, or a combination thereof. Publisher users can upload files free of digital rights management features, or grant other license controls to the uploaded material, such electronic books or literary works. The publishers can establish capabilities to purchase the material, for example, through a "Buy Book" function that can redirect links to ecommerce websites for the sale and download of material to an interested user. The electronic material category can be electronic books categorized as factual, fictional, educational, or literary. Publishers, like other users, will have to acknowledge a non-copyright infringement policy in order to participate in the portal and before uploading any information to be shared with the users of the portal.

The collaboration module can allow a plurality of users to work together and interact in the portal. A registered user requests access to a group. In one embodiment, the user provides permission for others to view status of the user regarding login on the portal. The user can control who can view the status, or can allow free viewing of status. The collaboration module can also allow groups to be formed that users can be invited to join by a member of the group or administrator of the group, or can join without invitation. In certain circumstances, collaboration groups can be designated private or open to public. Private groups can have a minimum or maximum age requirement, for example, no older than 18 years of age, or less than 18 years of age. In certain circumstances, the content of a private group can be viewed in as an overview or summary. If a group is designated public, its content will be available for all users to review, however only assigned group members will be able to participate in that specific group's activities.

The group administrator can establish the ability for group members to see the identification name of the other group members and presence of the group member (for example, login status) when collaborating in a group setting. The monitoring of group members can be achieved through a "Group Friends" identification process. This identification process can reference information from a user's registration profile, including, but not limited email and IP addresses. Users can create groups in any category available on the portal. In certain embodiments, each group can have at least one administrator or creator. A group administrator or creator can be responsible for granting access to requested users to any user group of the portal and can delegate additional administrative rights to one or more other users in the group.

In the collaboration module, the users can collaboratively author books, writings or other works in various categories and for particular purposes, for example, environmental, social or political issues. Collaborating users can create collaborative groups within which books, poems, song lyrics, writings or other works can be authored. A collaborative group can be created by a group administrator. The collaborating users can utilize a web-based authoring tool that can manage collaborative authoring. The web-based collaborative tool can be an open source customized tool. Collaboration users can choose from a selection of authoring approaches including sequential participation by passing control of authorship from one group member to another. Alternatively, an authoring approach of non-sequential participation, which can be regulated or controlled by a group administrator and a designated collaborator.

For example, in some circumstances, users from education and business institutions will be able to create collaboration forums in various categories and purpose. The forum can be established to stimulate creativity and generate targeted content. In other embodiments, the portal can be Section 508 compliant, to ensure access for people with vision impairments who rely on various electronic products such as screen readers, to access computer-based information, and translate what is on a computer monitor into automated audible output and the use of text labels or descriptors for graphics and certain format elements. The sales module, if present, can establish a commercial transaction that allows a user to buy a personal copy of the material. The sales module can accept payment directly or indirectly from the user. In certain other embodiments, rather than sell material directly to the user, the sales module can include a redirection module that sends the user to a separate location to purchase the material. For example, the redirection module can send the user to a retail location to make the purchase. Once the sale is complete, a download module provides the material that was purchase for download to the viewing device.

Other embodiments of the portal can include features that enhance the user experience by providing algorithm that can check the portal contents for document duplication or an algorithm that can check for inappropriate content uploads. The portal can also be enhanced by providing governance policies and procedures and other user compliance requirements that can improve the user experience and provide secure handling of the material on the portal.

Referring to the collaboration portal 100 shown in FIG. 1, in an embodiment, a server 110, a registration module 106, a reading module 102, and an upload module 104. The portal 100 can also include a collaboration module 105, or sales module 112 may comprise a general-purpose computer and can have an internal or external memory for storing data and programs such as an operating system (e.g., iOS, DOS, Windows 2000™, Windows XP™, Windows NT™, OS/2, UNIX or Linux) and one or more application programs. Examples of application programs include computer programs implementing the techniques described herein for lyric and multimedia customization, authoring applications (e.g., word processing programs, database programs, spreadsheet programs, or graphics programs) capable of generating documents or other electronic content; client applications (e.g., an Internet Service Provider (ISP) client, an email client, or an instant messaging (IM) client) capable of communicating with other computer users, accessing various computer resources, and viewing, creating, or otherwise manipulating electronic content; and browser applications (e.g., Microsoft's Internet Explorer) capable of rendering standard Internet content and other content formatted according to standard protocols such as the Hypertext Transfer Protocol (HTTP). One or more of the application programs can be installed on the internal or external storage of the general-purpose computer. Alternatively, in another embodiment, application programs can be externally stored in or performed by one or more device(s) external to the general-purpose computer.

In addition, user reading device 106 can be a device configured to provide an image of the material. The device may be or can include a desktop computer, a server, a laptop computer or other mobile computing device, a network-enabled cellular telephone (with or without media capturing/playback capabilities), wireless email client, or other client, machine or device to perform various tasks including Web browsing, search, electronic mail (email) and other tasks, applications and functions.

In certain embodiments, a file import module can import and transfer content into a collaboration, and to a portal database of the server for the verified users to allow the user to view and edit the content.

A working group is a collection of users who are members. The working group can be created by a group administrator. The group administrator can select or invite members for the working group. The size of the working group can be limited by the group administrator. The group administrator can allocate rights to the members of the working group. The allocated rights can be assigned on an individual basis and can include read only rights, edit and read rights, or full administrative rights. The full administrative rights can give the member the ability to invite or include other members in the working group. The working group can have a defined duration at which time the working group dissolves or the working group can exist until the group administrator dissolves the working group. When the working group dissolves, the ownership of the content created within the working group is held by the group administrator.

In certain embodiments, the file import module can allow files that reside within a specific working group's files directory listings and stored in a portal database on the server, to be transferred into a live collaboration.

A "collaboration" can be a live collaboration or a sequential collaboration. The collaboration can be established by the group administrator.

A live collaboration is an event that occurs in real time and consists of two or more collaboration invitees (working group members) interacting in the working group's centralized collaborative workspace at the same time. In a live collaboration, users are able to create, share and edit content in real time, collaboratively, in the presence of other members. In certain embodiments, all users in a working group can interact via audio, video and instant messaging with the group or individual members of the group.

A sequential collaboration is the process of sharing and editing of content by group members via the group's file directory asynchronously. The users can work serially or one user at a time. In a sequential collaboration, group members (with editing permissions) can modify and edit content that was uploaded directly to the group file directory or transferred at the conclusion of a live collaboration to the group file directory. Sequential collaboration initiates a file lock process that allows only one member at a time to make edits and modifications to a file at a time. The file lock is released when the member user completes work on the file.

Verified users are able to access the group file directory and import a file into a collaboration to view and edit the file content. Verified users are required to be group members to be able to import a file into a collaboration.

In certain embodiments, the file import module can include one or more of the following circumstances. For example, the import module can apply to both New Collaborations (NC) and Continued Collaborations (CC). During a NC/CC, members can import files (located in the current group file directory) to be shared and edited during a live collaboration event or for sequential collaboration.

In certain embodiments, all invitees to a collaboration can have the ability to import files into the collaboration event. For example, a member who imports a file also has the ability to remove the file from the collaboration.

In certain embodiments, the group administrator (GA) can also have the ability to remove the file from the collaboration. The GA is the group creator, and is responsible for all aspects of group management (creation, editing, membership, permissions, content policies and management). Creation refers to creating a new document for collaboration during the event. Editing refers to the editing or removal of a document during the collaboration event. Membership refers to the current group invitees to the live collaboration event. Permissions refers to current group invitees that have access to content and associated modifications. Content policies refers to the rules set forth via the platforms policies and procedures, and also by secondary group rules that can be established by the specific group administrator (GA).

In certain circumstances, each group member can have the ability to create an event. A group member who creates a group collaboration event, becomes the Event Creator (EC), and is provided with shared administrative privileges to that specific collaboration event.

The EC is a group member who (similar to the GA) has the session assigned ability to remove an imported file from the collaboration.

In certain embodiments, the GA and the EC can be the same group member.

In certain embodiments, files imported into a live collaboration from the group's file directory, can be temporarily locked from further file directory access (i.e., shown as a file in use), to prevent additional editing and modifications from group members who were not invitees to the collaboration.

The file lock is a database process that resides on the server and monitors, in real time, the editing status of all group files and their associated user usage mapping. The file lock can include an audit trail of members and the edits and timing of edits made by the member.

In certain embodiments, any invitee to a collaboration event can utilize the import module to share files with the collaboration invitees. For example, in order to share a file, the member must have current access to the file located in the current group file directory.

In certain embodiments, files imported into a collaboration event can have the file permissions updated to a default setting, to show that all invitees to the collaboration have access to the file; regardless as to the original file permission setting prior to importing the file into the collaboration. This can be an automatic database process that resides on the server and monitors, in real time, the permission settings of content.

In certain embodiments, the file permission levels can be further adjusted within the collaboration event to include group members who were not invitees to the current collaboration. This is the same database process, however, the file permission adjustments can be performed manually, thus overriding the automatic settings.

In certain embodiments, when the collaboration concludes, the imported file can become the new updated version of the original file. Both the new updated file and the original file versions can be available to group users with permission access, via the group's file directory.

In certain circumstances, the collaboration authoring tool allows verified users can selectively pass an electronic authoring and editing pen to each other while working together on file content.

In certain embodiments, when users are working within a collaboration, the authoring tool, which is managed by the GA and the EC, can allow users to pass an authoring and editing pen selectively between users to participate in creating and editing content. All verified users to the collaboration can be able to see the content creation and editing in real-time.

In certain embodiments, the authoring and editing pen can allow collaboration invitees to conduct changes to content. For example, a collaboration invitee in possession of the electronic authoring and editing pen is able to perform edits (tabulations, insertions, deletions, renaming, and reformatting) to content.

Generally, collaboration invitees are required to be a member of the group. However, a guest invitee database process can allow for registered non-group members and unregistered platform users to participate in a one-time session based live collaboration. The participation can be initiated by an email-based notification and confirmation process that provides secure authorization, access, and participation to the single-session live group collaboration.

At the conclusion of the live collaboration, the non-group member or unregistered platform user will not have access to the group content created during the collaboration. If the non-group member or unregistered platform user becomes a group member, that content, along with additional group content can become accessible to the new group member.

In certain embodiments, the GA and the EC can serve as administrators for the authoring tool during a collaboration and are able to manage and assign the authoring and editing pen to specific invitees to edit content. In other embodiments, only the GA can serve as administrator for the authoring tool.

In certain embodiments, the GA and the EC can have the ability to retrieve the assigned authoring and editing pen from any invitee at any time during a collaboration for continued editing or reassignment to another invitee during a collaboration event.

In certain embodiments, any invitee who is in possession of the authoring and editing pen can voluntarily assign the pen to another invitee attending the collaboration event.

In certain embodiments, an electronic pen indicator can show which invitee is currently in possession of the pen.

In certain embodiments, access rights to content produced with the authoring tool can be granted by default to all collaboration invitees. Additional access to content can be granted by the GA or EC to include non-invitee group members, during the live collaboration.

In certain embodiments, at the conclusion of the collaboration, content produced by the authoring tool can continue to be available to all group members with access rights, via the group file directory.

In certain embodiments, at the conclusion of the collaboration the GA or EC can further modify user access to produced content via the group's file directory. This can be a manual or automated process. The automated or manual settings for the content produced during the collaboration can go through additional user permissions modifications manually via the group file directory.]

In certain circumstances, the system can include a collaboration audio and video module, which can allow verified users to interact in real time while co-authoring, uploading, sharing, messaging, and publishing files.

In certain embodiments, when users are collaborating, the audio and video module can allow verified users the ability to interact aurally and visually, while participating in content creation and editing in real-time. The audio and video module can be an integrated component of the centralized collaboration workspace, and can be managed by the collaboration admin or event creator, who has the ability to select specific users for audio and video access during the collaboration.

In certain embodiments, the audio and video module can be controlled by the GA or the EC.

In certain embodiments, the audio and video module can work in real time synchronization with the authoring tool and editing pen, user management, group files management (upload module, import module, and file permissions), instant messaging, and the publishing of content. In a live collaboration, the audio and video module can work in conjunction with the hands free module by allowing the user to interact in the collaboration workspace by using the voice commands capability of the audio and video module to perform collaboration functions.

In certain embodiments, the GA or EC can have the ability to mute and unmute the audio from the list of invitees.

In certain embodiments, during a live collaboration, attendees can have the ability to select specific collaboration video streams from the list of invitees that they are interested in viewing. For example, by default, during a live collaboration, all invitees' video streams can be available for participating invitees to view. However, each invitee has the option to reduce or subsequently increase the number of video streams to present in their individual workspace.

In certain embodiments, the GA or EC can have the ability to remove or disconnect an invitee(s) from the live collaboration session.

In certain embodiments, video preference, i.e., control of displayed video content, can be given to the user who has been assigned the authoring and editing pen during a live collaboration. For example, live video of the user assigned the editing pen can temporarily become the central video in the collaboration workspace.

In certain circumstances, the system can include a hands free module allowing verified users to interact in real time while co-authoring, uploading, sharing, messaging, and publishing files. The hands free module can allow users to interact with the collaboration platform using voice commands to perform collaboration tasks. Users can individually guide the hands free module through a series of functions, examples of which are listed below:

"Create file" command: via audio instructions, creates a new file for users to author content and data.

"Assign authoring and editing pen" command: via audio instructions, assign or reassign the editing pen to a specific user.

"Audio to text writing" command: via audio instructions, the user can initiate the interpretation of audio to text writing and content creation.

"Change file permissions" command: via audio instructions, adjust group files access and permissions for group members.

"Upload" command: via audio instructions, the user can initiate a file upload to the collaboration or group files directory.

"Import" command: via audio instructions, the user can initiate a file import into the collaboration.

"Instant messaging" command: via audio instructions, the user can initiate instant messaging to other group invitees during a collaboration.

"Content publishing" command: via audio instructions, the user can initiate the publishing of created content to be shared with everyone on the platform.

"Text to audio playback" command: via audio instructions, the user can initiate instant playback from this module, to listen to audio-to-text content.

"Mute/unmute" command: via audio instructions, mute or unmute incoming and outgoing audio and video streaming.

In certain embodiments, the hands free module allows for content to be text-to-audio interpreted, and for audio-to-text interpreted. This module can be a component of the centralized collaboration workspace. Its capabilities can be achieved thru the integration of the platform's audio, video, content creation, uploading, importing, publishing, and messaging tools.

In certain embodiments, collaboration attendees can have the ability to individually enable or disable the hands free module during a live collaboration with other users, or an individual (authoring and editing) content creation session.

In certain embodiments, the hands free module can reside on the server platform (server side) and engages with the user's electronic device via web browser or mobile app (client side).

Server side processes can be inherently more secure and stable, since applications and database management takes place in a consistent environment. Client side processes can be in part dependent on the user device performance and security settings.

The server side component can host the platform application and databases, and executes all requests for data and content from the client side. The client side component refers to the user's web browser or mobile app interface which sends requests to the server side for data and content.

In certain embodiments, for audio-to-text interpretation, a collection of authoring and formatting commands (client side) can allow the user to control collaboration, editing and formatting functions, while creating content.

In certain embodiments, for text-to-audio interpretation, a collection of authoring and formatting commands (client side) can allows the user to analyze content revisions, by having the created content electronically read (audio) and displayed back to the user.

In certain embodiments, the hands free module can be managed individually by collaboration invitees and other verified group users.

In certain embodiments, the hands free module can provide authorized users with the ability to end a live collaboration or an individual content creation session by utilizing voice commands.

In certain circumstances, the system can include a highlighting and markup module allowing verified users to highlight and markup content.

In certain embodiments, the highlighting and markup module can allow for the highlighting and markup of content without the need for application or operating system specific editing software. For example, this module can be a component of the electronic reading module. In other examples, this module can be a component of the authoring tool.

In certain embodiments, the highlighting and markup module can work by allowing readers of content (for example, verified users) to virtually create highlights and markups of non-editable content by superimposing a temporary transparent editing layer over the existing non-editable content.

In certain embodiments, the highlighting and markup module can provide a superimposing layer that provides a precise overlay for the non-editable content, and records and stores temporary edits, by calculating two dimensional positional placements of highlights and markups over the non-editable content. For example, the superimposing layer is a secondary temporary file that is created, positioned over, and linked to the non-editable content. The platform server database can record and store the relationship between the non-editable content and the superimposing layer file.

Content and edits (highlighting and markups) added to the superimposing layer in reference to the non-editable content, are positioned over the non-editable content, and the positions of the added content and edits are recorded in a two dimensional Cartesian coordinate system (x and y axis values) and stored and recorded in the platform server database.

In certain embodiments, highlights and markups can be color based, shaped-based, text-based, image-based, freehand, or any combination thereof.

In certain embodiments, the highlighting and markup module can provide the ability for any content that is managed by the electronic reading module to have an unlimited number of editable transparent layers for highlighting and markups, by verified users on the server platform.

In certain embodiments, the highlighting and markup module can provide each user with a personalized experience, and stores highlighting and markups of content within the verified user's profile on the server platform.

In certain embodiments, verified users can only be able to access highlighting and markups that they created in reference to specific content. For example, each registered user has an individual profile which hosts attributes and actions associated with the user. These actions and attributes are stored in the platform's database.

In certain embodiments, verified users can be able to delete or continually edit and modify their highlighting and markups superimposed on specific content. For example, when a user creates a highlighting and markup layer for a specific non-editable content, a unique database mapping relationship can be established between the user, layer data, and the non-editable content. This relationship data is stored on the server platform. Layer data for each user can be maintained independently of other layer data.

The general-purpose computer may include a central processing unit (CPU) for executing instructions in response to commands, and a communication device for sending and receiving data. One example of the communication device is a modem. Other examples include a transceiver, a communication card, a satellite dish, an antenna, a network adapter, or some other mechanism capable of transmitting and receiving data over a communications link through a wired or wireless data pathway.

The general-purpose computer may also include an input/output interface that enables wired or wireless connection to various peripheral devices. Examples of peripheral devices include, but are not limited to, a mouse, a mobile phone, a personal digital assistant (PDA), a keyboard, a display monitor with or without a touch screen input, and an audiovisual input device. In another implementation, the peripheral devices may themselves include the functionality of the general-purpose computer. For example, the mobile phone or the PDA may include computing and networking capabilities and function as a general purpose computer by accessing a network and communicating with other computer systems. Examples of a network, such as network 108, include the Internet, the World Wide Web, WANs, LANs, analog or digital wired and wireless telephone networks (e.g., Public Switched Telephone Network (PSTN), Integrated Services Digital Network (ISDN), and Digital Subscriber Line (xDSL)), radio, television, cable, or satellite systems, and other delivery mechanisms for carrying data. A communications link can include communication pathways that enable communications through one or more networks.

In one implementation, a processor-based system of the general-purpose computer can include a main memory, preferably random access memory (RAM), and can also include a secondary memory. The secondary memory can include, for example, a hard disk drive or a removable storage drive, representing a floppy disk drive, a magnetic tape drive, an optical disk drive (Blu-Ray, DVD, CD drive), magnetic tape, paper tape, punched cards, standalone RAM disks, Iomega Zip drive, etc. The removable storage drive can read from or write to a removable storage medium. A removable storage medium can include a floppy disk, magnetic tape, optical disk (Blu-Ray disc, DVD, CD) a memory card (CompactFlash card, Secure Digital card, Memory Stick), paper data storage (punched card, punched tape), etc., which can be removed from the storage drive used to perform read and write operations. As will be appreciated, the removable storage medium can include computer software or data.

In alternative embodiments, the secondary memory can include other similar means for allowing computer programs or other instructions to be loaded into a computer system. Such means can include, for example, a removable storage unit and an interface. Examples of such can include a program cartridge and cartridge interface (such as the found in video game devices), a removable memory chip (such as an EPROM or PROM) and associated socket, and other removable storage units and interfaces, which allow software and data to be transferred from the removable storage unit to the computer system.

In this document, the terms "computer program medium" and "computer readable medium" are generally used to refer to media such as a removable storage device, a disk capable of installation in a disk drive, and signals on a channel. These computer program products may provide software or program instructions to a computer system.

Computer-readable media include both volatile and non-volatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, DVD, holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. An exemplary modulated data signal includes a carrier wave or other transport mechanism. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

Computer programs which may be associated with the portal may be stored in the main memory or secondary memory. Such computer programs can also be received via a communications interface. Such computer programs, when executed, may enable the computer system to perform the features as discussed herein. In particular, the computer programs, when executed, may enable the processor to perform the described techniques. Accordingly, such computer programs may represent controllers of the computer system.

In an embodiment where the elements are implemented using software, the software can be stored in, or transmitted via, a computer program product and loaded into a computer system using, for example, a removable storage drive, hard drive or communications interface. The control logic (software), when executed by the processor, may cause the processor to perform the functions of the techniques described herein.

In another embodiment, the elements may be implemented primarily in hardware using, for example, hardware components such as PAL (Programmable Array Logic) devices, application specific integrated circuits (ASICs), or other suitable hardware components. Implementation of a hardware state machine so as to perform the functions described herein will be apparent to a person skilled in the relevant art(s). In yet another embodiment, elements may be implanted using a combination of both hardware and software.

In another embodiment, the computer-based methods can be accessed or implemented over the World Wide Web by providing access via a Web Page to the methods described herein. Accordingly, the Web Page may be identified by a Universal Resource Locator (URL). The URL may denote both a server and a particular file or page on the server. In this embodiment, it is envisioned that a client computer system, which may be the client device 106, may interact with a browser to select a particular URL, which in turn may cause the browser to send a request for that URL or page to the server identified in the URL. Typically, the server may respond to the request by retrieving the requested page and transmitting the data for that page back to the requesting client computer system, which may be the client device 106 (the client/server interaction may be typically performed in accordance with the hypertext transport protocol or HTTP). The selected page may then be displayed to the user on the client's display screen. The client can then cause the server containing a computer program to launch an application, for example, to perform an analysis according to the described techniques. In another implementation, the server can download an application to be run on the client to perform an analysis according to the described techniques.

While particular embodiments of the invention have been illustrated and described in detail herein, it should be understood that various changes and modifications might be made to the invention without departing from the scope and intent of the invention. The embodiments described herein are intended in all respects to be illustrative rather than restrictive. Alternate embodiments will become apparent to those skilled in the art to which the present invention pertains without departing from its scope.

From the foregoing it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and within the scope of the appended claims.

What is claimed is:

1. A computer-implemented system for managing access to electronic content comprising:
    a server for storing instructions and data;
    a computer-implemented server software module containing a plurality of files including content on the server including a processor;
    a registration software module on the server collecting user information for a plurality of users to a portal to the server and for creating a profile of data associated with each user, the data being on the server, wherein the plurality of users of the collaboration portal register as a regular member or a publisher member via a graphical user interface front end, the regular member having authorization to read, share, collaborate, or upload material;
    an electronic reading software module on the server providing access to each user to selected content for user visualization on a user reading device from the server without downloading the content to the user reading device, the software module verifying that the user can have access to publisher rights for the selected book by checking user information on the server and the profile;
    an upload software module on the server transferring content to a portal database of the server for the verified user to allow the user to view the content, edit the content, and to associate with the profile of the user via the graphical user interface front end;
    a collaboration audio and video software module allowing verified users to interact in real time while co-authoring, uploading, sharing, messaging, and publishing files; and
    a collaboration authoring tool permitting at least two verified users to share digitally formatted information each from a respective user reading device via a portal having the graphical user interface front end, work together and interact in the portal of the graphical user interface front end containing digitally stored information, use a web-based authoring tool that manages collaborative authoring including passing control of authorship from one group member to another and generate targeted content in the portal of the graphical user interface front end by selectively passing an electronic authoring and editing pen, wherein the passing control at the graphical user interface front end is regulated or controlled by a group administrator or a designated collaborator who establishes a policy applied to each user by the server to the collaboration, the policy managed by the server permitting a user to retrieve control of authorship at any time during a collaboration for continued editing or reassignment to another designated collaborator during a collaboration event, while permitting data for the history and activities for each user while working together and interacting in the portal having a graphical user interface front end in the collaboration software module to be summarized and associated with each user's profile, creating a summary of user history and activities for access in the profile of each user and storing the summary in a database on a network.

2. The system of claim 1, wherein the plurality of users include a publisher.

3. The system of claim 1, wherein the file has a data, document, audio, or video format.

4. The system of claim 1, wherein the collaboration authoring tool allows verified users to selectively pass an electronic authoring and editing pen to each other while working together on file content.

5. A computer-implemented system for managing access to electronic content comprising:
    a server for storing instructions and data;
    a computer-implemented server software module containing a plurality of files including content on the server including a processor;
    a registration software module on the server collecting user information for a plurality of users to a portal to the server and for creating a profile of data associated with each user, the data being on the server, wherein the plurality of users of the collaboration portal register as a regular member or a publisher member via a graphical user interface front end, the regular member having authorization to read, share, collaborate, upload material;
    an electronic reading software module on the server providing access to each user to selected content for user visualization on a user reading device from the server without downloading the content to the user reading device, the software module verifying that the user can have access to publisher rights for the selected book by checking user information on the server and the profile;
    an upload software module on the server transferring content to a portal database of the server for the verified user to allow the user to view the content, edit the content, and to associate with the profile of the user via the graphical user interface front end;
    a collaboration audio and video software module allowing verified users to interact in real time while co-authoring, uploading, sharing, messaging, and publishing files;
    a collaboration authoring tool permitting at least two verified users to share digitally formatted information each from a respective user reading device via a portal having the graphical user interface front end, work together and interact in the portal of the graphical user interface front end containing digitally stored information, use a web-based authoring tool that manages collaborative authoring including passing control of authorship from one group member to another and generate targeted content in the portal of the graphical user interface front end by selectively passing an electronic authoring and editing pen, wherein the passing control at the graphical user interface front end is regulated or controlled by a group administrator or a designated collaborator who establishes a policy applied to each user by the server to the collaboration, the policy managed by the server permitting a user to retrieve control of authorship at any time during a collaboration for continued editing or reassignment to another designated collaborator during a collaboration event, while permitting data for the history and activities for each user while working together and interacting in the portal having a graphical user interface front end in the collaboration software module to be summarized and associated with each user's profile, creating a summary of user history and activities for access in the profile of each user and storing the summary in a database on a network, and a hands free software module allowing verified users to interact in real time while co-authoring, uploading, sharing, messaging, and publishing files and allowing for content to be text-to-audio and text-to-audio interpreted.

6. A computer-implemented system for managing access to electronic content comprising:

a server for storing instructions and data;

a computer-implemented server software module containing a plurality of files including content on the server including a processor;

a registration software module on the server collecting user information for a plurality of users to a portal to the server and for creating a profile of data associated with each user, the data being on the server, wherein the plurality of users of the collaboration portal register as a regular member or a publisher member via a graphical user interface front end, the regular member having authorization to read, share, collaborate, or upload material;

an electronic reading software module on the server providing access to each user to selected content for user visualization on a user reading device from the server without downloading the content to the user reading device, the software module verifying that the user can have access to publisher rights for the selected book by checking user information on the server and the profile;

an upload software module on the server transferring content to a portal database of the server for the verified user to allow the user to view the content, edit the content, and to associate with the profile of the user via a graphical user interface front end;

a collaboration audio and video software module allowing verified users to interact in real time while co-authoring, uploading, sharing, messaging, and publishing files;

a collaboration authoring tool permitting at least two verified users to share digitally formatted information each from a respective user reading device via a portal having the graphical user interface front end, work together and interact in the portal of the graphical user interface front end containing digitally stored information, use a web-based authoring tool that manages collaborative authoring including passing control of authorship from one group member to another and generate targeted content in the portal of the graphical user interface front end by selectively passing an electronic authoring and editing pen, wherein the passing control at the graphical user interface front end is regulated or controlled by a group administrator or a designated collaborator who establishes a policy applied to each user by the server to the collaboration, the policy managed by the server permitting a user to retrieve control of authorship at any time during a collaboration for continued editing or reassignment to another designated collaborator during a collaboration event, while permitting data for the history and activities for each user while working together and interacting in the portal having a graphical user interface front end in the collaboration software module to be summarized and associated with each user's profile, creating a summary of user history and activities for access in the profile of each user and storing the summary in a database on a network, and a highlighting and markup software module allowing verified users to highlight and markup content by superimposing a transparent editing layer over the existing non-editable content.

7. The system of claim 6, further comprising a file import software module importing and transferring content into a collaboration, and to a portal database of the server for the verified users to allow the user to view and edit the content.

* * * * *